United States Patent
Pedersen et al.

(10) Patent No.: US 8,936,397 B2
(45) Date of Patent: Jan. 20, 2015

(54) SLIDING BEARING AND METHOD TO PERFORM SERVICE AT A SLIDING BEARING

(71) Applicants: Bo Pedersen, Lemvig (DK); Kim Thomsen, Ikast (DK)

(72) Inventors: Bo Pedersen, Lemvig (DK); Kim Thomsen, Ikast (DK)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/029,874

(22) Filed: Sep. 18, 2013

(65) Prior Publication Data
US 2014/0086515 A1 Mar. 27, 2014

(30) Foreign Application Priority Data
Sep. 24, 2012 (EP) .................................... 12185642

(51) Int. Cl.
| | |
|---|---|
| *F16C 17/00* | (2006.01) |
| *F16C 33/24* | (2006.01) |
| *F16C 17/02* | (2006.01) |
| *F03D 11/00* | (2006.01) |
| *F16C 17/03* | (2006.01) |
| *F16C 43/02* | (2006.01) |

(52) U.S. Cl.
CPC .............. *F16C 17/02* (2013.01); *F03D 11/0008* (2013.01); *F03D 11/0016* (2013.01); *F16C 17/03* (2013.01); *F16C 43/02* (2013.01); *F16C 2235/00* (2013.01); *F16C 2237/00* (2013.01); *F16C 2300/14* (2013.01); *F16C 2360/31* (2013.01)
USPC .......................................... 384/282; 384/309

(58) Field of Classification Search
CPC ...... F03D 11/0008; F16C 17/02; F16C 17/03; F16C 2235/00; F16C 2237/00; F16C 43/02
USPC ................. 384/282, 302, 303, 304, 309, 312; 416/174
See application file for complete search history.

(56) References Cited

U.S. PATENT DOCUMENTS 8,079,761 B1 * 12/2011 Wadehn et al. ............... 384/118
8,172,531 B2 * 5/2012 Wadehn ........................ 416/27

FOREIGN PATENT DOCUMENTS

| EP | 2306008 A2 | 4/2011 |
|---|---|---|
| WO | WO 2008126362 A1 | 10/2008 |
| WO | WO 2011003482 A2 | 1/2011 |

\* cited by examiner

*Primary Examiner* — Phillip A Johnson

(57) ABSTRACT

A sliding bearing of a wind turbine and a method to perform a service at a sliding bearing are proposed. The sliding bearing has a first bearing shell and a second bearing shell and a plurality of bearing pads arranged between the first bearing shell and the second bearing shell. The bearing pads are connected to the second bearing shell and the first bearing shell has a sliding surface that is prepared and arranged so that the bearing pads can slide along the sliding surface when the bearing shells are moved in respect to each other. A machining element is arranged between the first bearing shell and the second bearing shell to treat the sliding surface of the first bearing shell.

12 Claims, 8 Drawing Sheets

SLIDING BEARING AND METHOD TO PERFORM SERVICE AT A SLIDING BEARING

CROSS REFERENCE TO RELATED APPLICATIONS

The present application claims priority to European Patent Office application No. 12185642.1 EP filed Sep. 24, 2012, the entire content of which is hereby incorporated herein by reference.

FIELD OF INVENTION

The invention relates to a sliding bearing and a method to perform a service at a sliding bearing.

BACKGROUND OF INVENTION

A wind turbine transfers the energy of moving air into electrical energy. The moving air accelerates the rotor of the wind turbine. The rotation of the rotor is transferred to an electrical generator. The electrical generator transforms the rotational energy into electrical energy.

In the last years the concept of a direct driven wind turbine was established. In a direct driven wind turbine the rotational energy of the rotor is transferred to the generator directly without the use of a gearbox.

In a direct driven wind turbine the rotor of the wind turbine is directly connected to the rotor of the electrical generator. The chain of mechanically connected parts leading from the rotor of the wind turbine to the rotor of the generator is called the drive train of the wind turbine.

To allow the rotational movement and to provide the necessary stability of the rotating parts, the drive train is mounted with at least one bearing. This bearing allows the drive train to rotate. At the same time it provides the necessary stability by supporting the radial and axial loads and the bending moments present in the drive train.

WO 2011/003482 A2 describes a wind turbine main bearing realized to bear a shaft of a wind turbine. The bearing comprises a fluid bearing with a plurality of bearing pads. The document describes a bearing with a cylindrical bearing surface and a series of trust pads.

During the operation of the bearing foreign particles can enter the bearing or small pieces of the bearing pads might break off and stay in the bearing. These particles can cause defects or damages like scratches in the sliding surface of the bearing.

Defects in the sliding surface again lead to a higher friction that leads to a higher wear in the bearing. Therefore the sliding bearing has to be cleaned during service to remove loose particles from the bearing.

After some time of operation the bearing or parts of the bearing need to be exchanged during service because of damages in the sliding surface. A main bearing in a wind turbine especially in a direct driven wind turbine has a diameter of 2 meter or more and is heavy. This makes it very difficult to exchange it.

The exchange of a bearing in a wind turbine, especially a bearing in the drive train, is very complicated and costly. Often a crane has to be erected and the rotor of the wind turbine has to be dismantled. The Bearing is then exchanged and the rotor is mounted to the nacelle again. For other wind turbines, a crane is needed to lift a part of the drive train out of the nacelle of the wind turbine. The bearing or bearings are then exchanged and the drive train is mounted again.

Especially in the case of an off-shore installation this exchange is very expensive, as a specialized vessel is needed to perform the crane lift.

The bearings can then be refurbished in a plant specialized for this kind of work. The bearings can then also be reused.

Little defects like scratches have a negative effect on the lubrication and on the condition of the bearing pads. When the bearing shows too many of those defects, the bearing needs to be exchanged during service. The bearing can be refurbished and used again. The exchange of the bearing is very time consuming and expensive and needs to be avoided as long as possible.

SUMMARY OF INVENTION

The aim of the invention is therefore to provide an improved bearing and a method to perform service at this bearing.

The aim is reached by the features of the independent claims. Preferred embodiments of the invention are described in the dependent claims.

A sliding bearing of a wind turbine comprises a first bearing shell and a second bearing shell and a plurality of bearing pads arranged between the first bearing shell and the second bearing shell.

The bearing pads are connected to the second bearing shell and the first bearing shell comprises a sliding surface that is prepared and arranged in a way that the bearing pads can slide along the sliding surface when the bearing shells are moved in respect to each other.

A machining element is arranged between the first bearing shell and the second bearing shell to treat the sliding surface of the first bearing shell.

A sliding bearing is also called a friction bearing, a floating bearing or a sleeve bearing. The sliding bearing can transfer radial and/or axial forces or tilting moments. A sliding bearing comprises a sliding surface at one of the bearing shells. Bearing pads are usually detachable attached to the other bearing shell and slide along the sliding surface when the bearing when the bearing is in operation, i.e. in motion.

The bearing pads are segmented so that a certain number of bearing pads are used in a sliding bearing. The bearing pads are subject to wear. Therefore bearing pads need to be exchanged and replaced by new bearing pads after some time of usage and after they are worn.

A machining element is an element that shows a capability to perform machining operations on a surface. The machining element is capable to perform machining operation on the sliding surface of the sliding bearing. Machining operation performed by the machining element can be grinding, sanding or polishing of the surface. This includes operations for surface processing of the sliding surface.

During the operation of the bearing the sliding surface of the bearing will experience damages in the sliding surface like scratches or grooves. These damages come from foreign particles that enter the bearing, from dust or from fragment from parts of the bearing or the bearing pads.

The grooves and scratches lead to a weaker lubrication, especially a thinner layer of lubricant in the bearing, and therefore to a higher wear.

The machining element performs machining operations on the surface. Thus grooves and scratches in the surface can be removed.

The machining element is arranged between the first and the second bearing shell. Thus the machining operation is performed in the sliding bearing, while the bearing shells are assembled together. Thus the sliding surface of the bearing is treated while the bearing shells are assembled together and the bearing is installed in its place of operation. Thus there is no need to dismount the bearing, or to transport the bearing to a machine. Depending on the size of the bearing no heavy machinery is needed to dismantle or transport the bearing.

The service at the bearing is performed on spot. Thus transportation time is saved, thus service time is saved.

The machining element can perform the machining operation on the sliding surface, when the bearing is rotating. Thus no drive is needed in the machining element. Thus no additional power is needed to operate the machining element.

At least one of the bearing pads is prepared and arranged in a way that it is replaceable by the machining element. A bearing pad can be dismounted from the bearing shell and can be taken out of the bearing. The place where the bearing pad has been mounted in the bearing can be used to place the machining element in the bearing.

Thus no additional space has to be provided to install the machining element in the bearing. Thus the machining element is mounted to the bearing shell with the same mechanism as the bearing pads use. Thus the machining element can be placed in different spots in the bearing. The machining element is a bearing pad with a machining surface.

A bearing pad can be equipped with a surface that shows machining property. Thus the machining element is assembled from a standard part used in the bearing. Thus a machining element can be established very easily. Thus the machining element is cheap. Thus the machining element has the same size and the same connection interface as a bearing pad.

At least one bearing pad comprises a pad carrier and a liner, and the machining element is a pad carrier with a liner with a machining property. A bearing pad comprises a pad carrier and a liner. The liner is subject to wear and is exchanged during service. The liner is mounted to the pad carrier. The pad carrier is mounted to the bearing shell.

The liner used during normal operation is exchanged and replaced by a liner used to perform machining operation at the sliding surface. To perform this operation, the liner has a surface with machining properties. This can be a sanding surface or a polishing surface for example.

The liner can be exchanged very easily. Thus the liner with the machining property can be placed in the sliding bearing very easy. Thus service time is saved, thus service costs are saved.

The replacement of the liner can easily be performed. Thus the machining of the surface can be performed more often. Thus damages in the surface can be treated, when the damage is still small. Thus a beginning damage will not get to big. Thus the sliding surface is in a good condition during the time of operation.

A sliding bearing comprises an opening in the first bearing shell, whereby the opening is a through hole leading from the outer surface to the inner surface of the first bearing shell. The opening is prepared and arranged in a way that the machining element can be arranged between the first bearing shell and the second bearing shell through the opening.

The bearing pads are connected to the second bearing shell. The bearing pads slide along the first bearing shell.

An opening is provided in the first bearing shell. The bearing pads can be seen and exchanged through this opening. Due to the movability of the second bearing shell in respect to the first bearing shell, all bearing pads can be reached through the opening.

Thus a machining element can be arranged between the bearing shells through the opening. Thus the bearing does not need to be opened completely, or the bearing shells do not need to be separated.

When just the opening in the bearing shell is opened, less foreign particles and dust have the chance to enter the bearing. Thus less damage can be done to the sliding surface, thus the lifetime of the bearing is increased.

At least one bearing pad is prepared and arranged in a way that the thickness of the bearing pad can be adapted to the clearance between the first and the second bearing shell.

When the sliding surface is machined, the clearance between the bearing shells can have changed. The bearing pads need to be adjusted to achieve the same tolerance in the bearing again as there was before the machining. The tolerance of the sliding bearing depends on the use of the bearing and depends on the loads a sliding bearing has to take.

A bearing pad comprises a possibility to adjust the thickness of the bearing pad. Thus the thickness of the bearing pad can be adapted to the clearance in the bearing. Thus the bearing pads can be used in the bearing after machining the sliding surface, thus the bearing pads do not need to be exchanged. Thus less material is needed. Thus costs are saved.

At least one bearing pad comprises an adjustment mechanism, so that the thickness of the bearing pad can be adjusted to the clearance between the first and the second bearing shell. A bearing pad can be adjusted to a certain height needed. The height of the bearing pad needs to fit to the clearance in the bearing to achieve a certain tolerance of the sliding bearing. A bearing pad comprises an adjustment mechanism so that the height of the bearing pad can be adjusted. Thus the height of the bearing pad can be adjusted to the clearance in the bearing. Thus the bearing pad can be used in the bearing after the machining.

A sliding bearing comprises a shin to adjust the thickness of at least one bearing pad to the clearance between the first and the second bearing shells.

A bearing pad is used together with a shin. Thus the height of the bearing pad can be adjusted to the clearance in the bearing. Shins are a cheap material. Thus the adjustment can be done very cost effective.

The sliding bearing is a bearing in a wind turbine. In wind turbines bearings are used for different purposes. Bearings are used as a yaw bearing, as pitch bearings for the rotor blades and in the drive train of the wind turbine. bearings in the drive train are bearings to stabilize the rotor, bearings in a gear box or bearings in the generator for example.

The bearings in a wind turbine are often difficult to exchange. Especially in an offshore installation a crane on a vessel is required to un-mount the rotor or the nacelle of a wind turbine.

Sliding bearings are used in a wind turbine, especially for the bearings with a large diameter. Thus the sliding surface of a sliding bearing in a wind turbine can be machined without the need of a crane and a vessel. Thus the service of the bearing can be done on spot. Thus the service is much cheaper and the downtime of the wind turbine is reduced.

The sliding bearing is the main bearing in a direct driven wind turbine. A direct driven wind turbine has a rotor with rotor blades that is directly coupled to the generator-rotor. The rotor of the wind turbine is supported by a main bearing. Often the rotor of the generator is supported by the same bearing.

This bearing shows a diameter of more then one meter. a sliding bearing is often used for this purpose. The rotor of the wind turbine has to be disassembled to exchange the bearing. A crane is needed for this operation.

The sliding surface of the baring is machined on spot. The bearing can stay mounted in the wind turbine during the machining operation. Thus the rotor does not need to be disassembled. Thus service time is saved, thus a crane is saved. Thus the costs of service are reduced and the downtime of the wind turbine is minimized.

A method to perform a service at a sliding bearing comprises the steps of treating the sliding surface of the bearing by the use of a machining element that is arranged between the first bearing shell and the second bearing shell.

A machining element is arranged between the first and the second bearing shell. The machining element is performing a machining operation at a surface in the bearing.

The bearing is rotated to apply the machining element on an inner surface of the bearing. Thus no additional drive is needed in the machining element. Thus no additional power connection is needed from the machining element to a power source. The bearing is flushed to remove loose particles from the bearing.

After the machining operation loose particles from the surface of the bearing shell or the machining element might be in the bearing. Thus the bearing is cleaned after the machining. The bearing is flushed with a liquid to remove the loose particles and the dust from the bearing. Loose particles and dust can cause damage in the sliding bearing. Oil can be used as a liquid for flushing the bearing. Thus the loose particles and the dust are removed from the bearing. Thus no damage can be done to the sliding surface due to loose particles. Thus the lifetime of the bearing is increased.

A machining element is used in an arrangement or in a method according to the invention.

BRIEF DESCRIPTION OF THE DRAWINGS

The invention is shown in more detail by the help of figures. The figures show a preferred configuration and do not limit the scope of the invention.

DETAILED DESCRIPTION OF INVENTION

Figure 1:
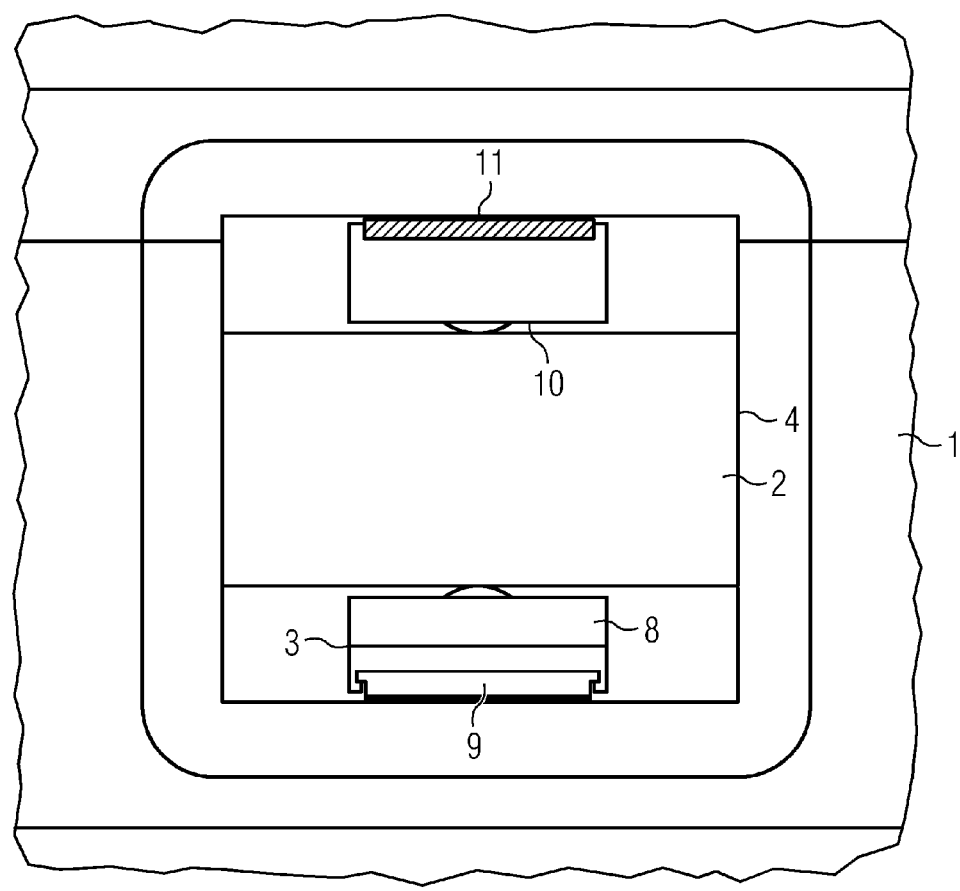
FIG. 1 shows a detail of a sliding bearing

FIG. 1 shows a detail of a sliding bearing.
FIG. 1 shows an opening 4 in a first bearing shell 1. Through the opening 4 a second bearing shell 2 is visible. A bearing pad 3 comprises a pad carrier 8 and a liner 9. The pad carrier 3 is attached to the second bearing shell 2. The liner 9 is attached to the pad carrier 8.

The surface of the liner 9 is sliding along the sliding surface of the first bearing shell 1 when the bearing shells are rotating in respect to each other.

A machining element 10 comprising a machining surface 11 is arranged between the first bearing shell 1 and the second bearing shell 2. The machining element 10 is attached to the second bearing shell 2.

The machining surface 11 is sliding along the sliding surface of the first bearing shell 1 when the bearing shells are rotating in respect to each other. The machining surface 11 is then treating the sliding surface of the first bearing shell 1.

Figure 2:
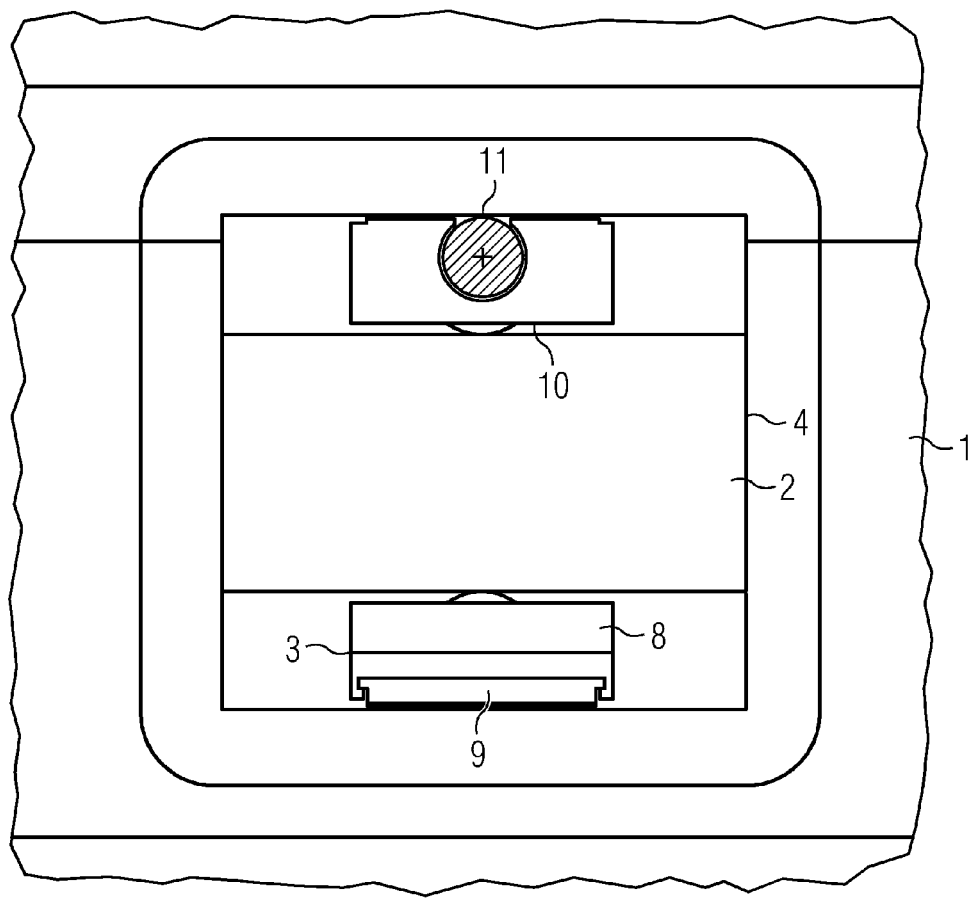
FIG. 2 shows a second embodiment of the sliding bearing

FIG. 2 shows a second embodiment of the sliding bearing.
FIG. 2 shows an opening 4 in a first bearing shell 1. Through the opening 4 a second bearing shell 2 is visible. A bearing pad 3 comprising a pad carrier 8 and a liner 9 is attached to the second bearing shell 2.

A machining element 10 comprising a machining surface 11 is arranged between the first bearing shell 1 and the second bearing shell 2. The machining element 10 is attached to the second bearing shell 2.

The machining surface 11 is sliding along the sliding surface of the first bearing shell 1 when the bearing shells are rotating in respect to each other. The machining surface 11 is then treating the sliding surface of the first bearing shell 1.

Figure 3:
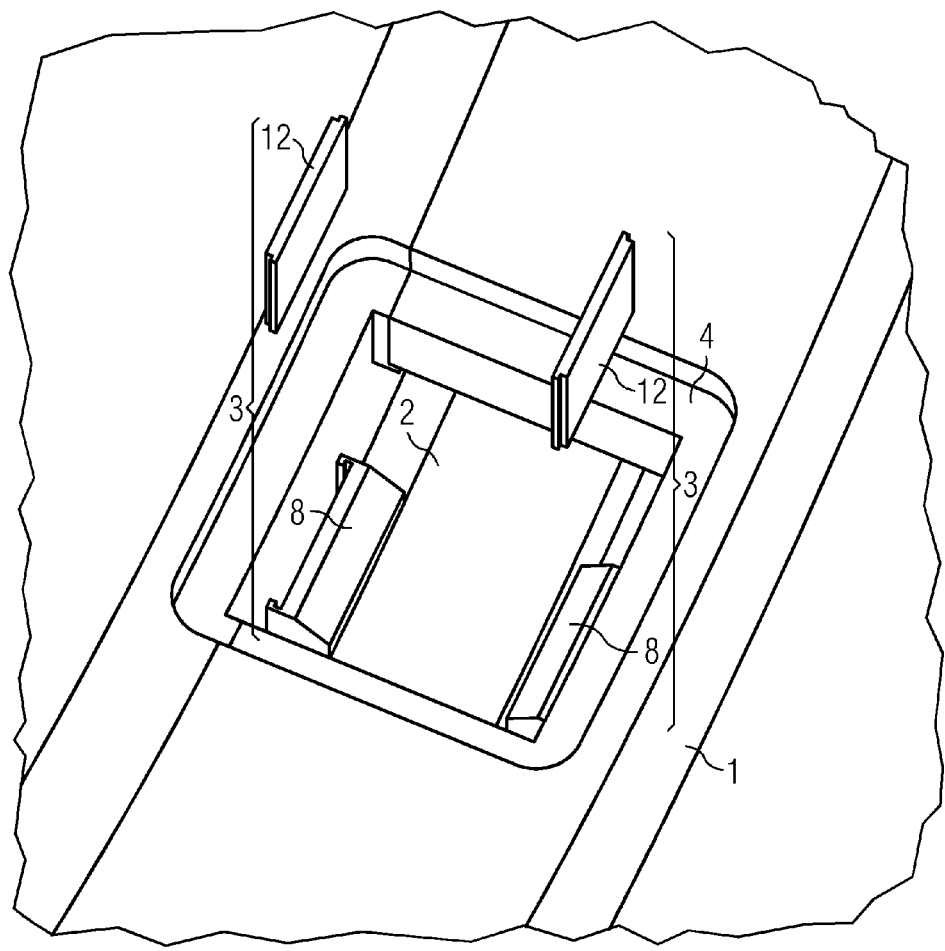
FIG. 3 shows a third embodiment of the sliding bearing

FIG. 3 shows a third embodiment of the sliding bearing.
FIG. 3 shows an opening 4 in a first bearing shell 1 of a sliding bearing. Two pad carriers 8 are visible. During normal operation the pad carriers 8 hold liners 9 that comprise a surface that slides along the sliding surface of the first bearing shell 1 during operation of the baring.

The liners 9 of the pad carriers are exchanged by liners with a machining property 12. These liners treat the sliding surface of the first bearing shell, when the first and the second bearing shell are rotated in respect to each other. The liners 12 can be exchanged through the opening 4.

Figure 4:
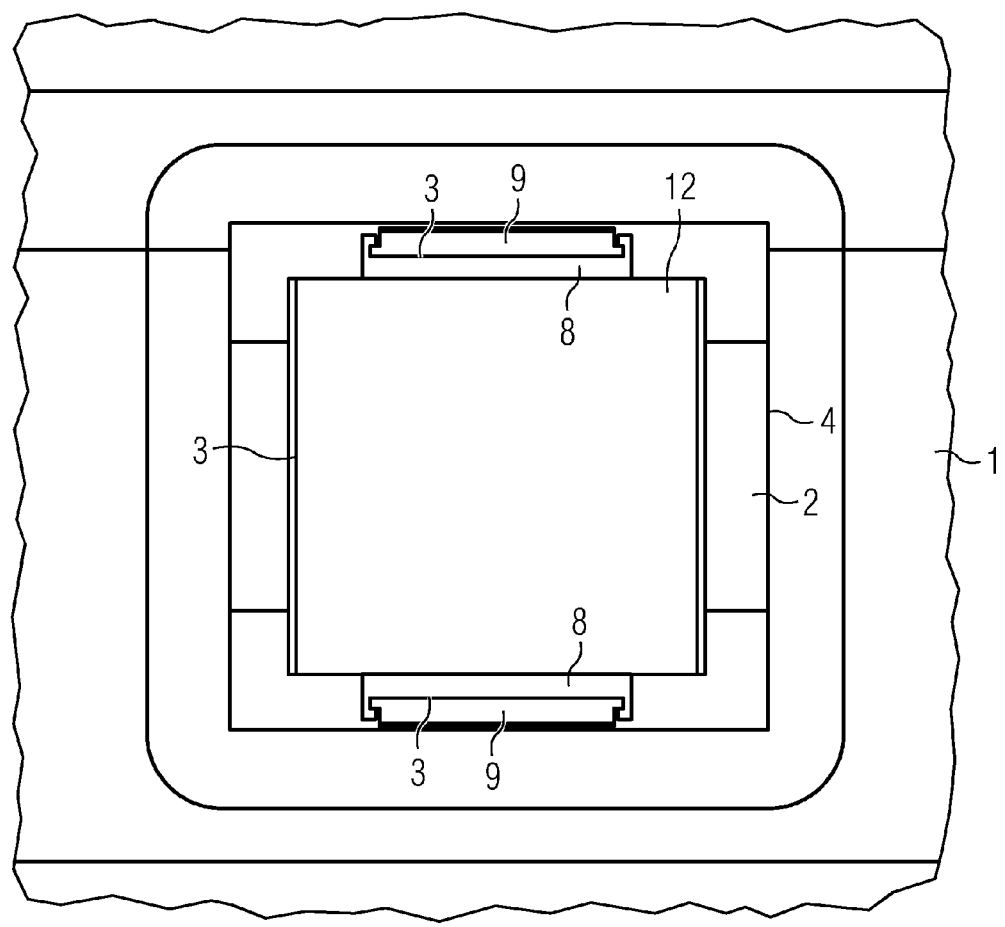
FIG. 4 shows a detail of the third embodiment of the sliding bearing

FIG. 4 shows a detail of the third embodiment of the sliding bearing.

FIG. 4 shows an opening 4 in a first bearing shell 1. Three bearing pads 3 are visible through the opening 4. Two of the bearing pads 3 comprise a pad carrier 8 and liners 9. The third pad carrier is equipped with a liner 12 with a surface with a machining property 12. This third liner is facing the opening 4. The liner 12 can be exchanged through the opening 4.

Figure 5:
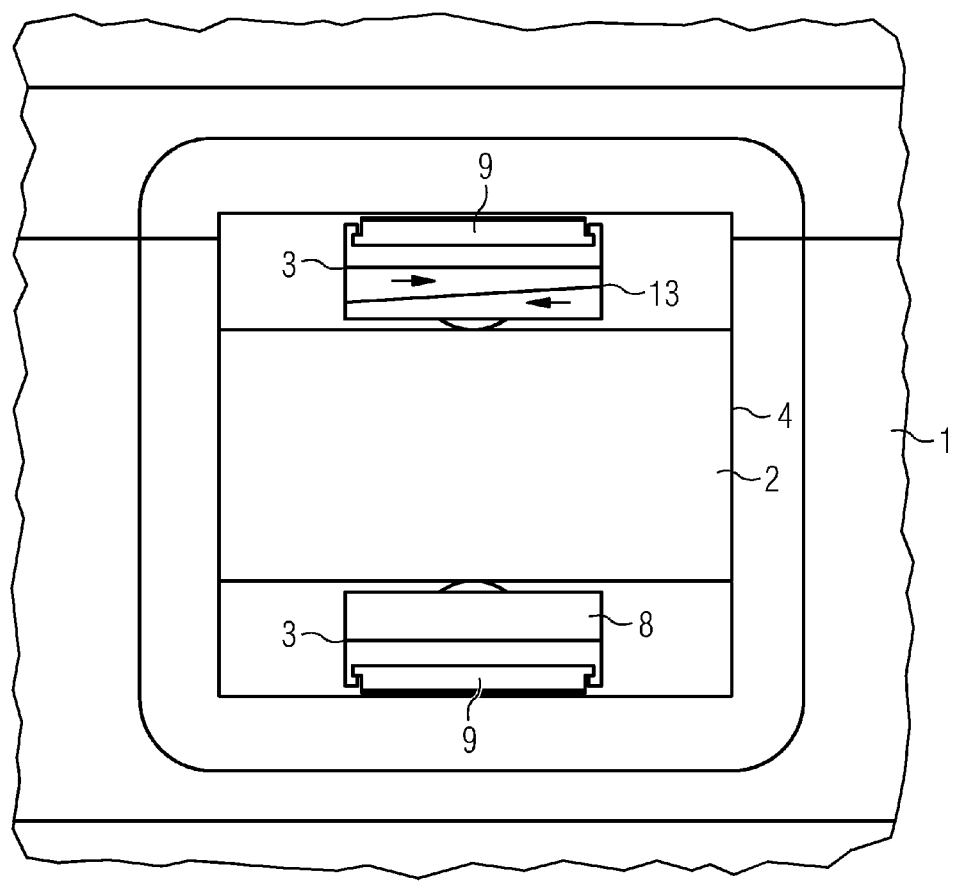
FIG. 5 shows a bearing pad with an adjustment mechanism

FIG. 5 shows a bearing pad with an adjustment mechanism.
FIG. 5 shows an opening 4 in a first bearing shell 1. The second bearing shell 2 is visible through the opening 4. Two bearing pads 3 are visible. The bearing pads 3 comprise a pad carrier 8 and liners 9.

One of the pad carriers 3 shows an adjustment mechanism 13. By using the adjustment mechanism 13 the height of the pad carrier 3 can be adjusted.

After the treatment of the sliding surface of the sliding bearing the clearance between the first bearing shell 1 and the second bearing shell 2 might have changed. The height of the bearing pad 3 can be adjusted to keep the tolerance of the sliding bearing constant.

In this embodiment the height of the bearing pad 3 can be adjusted by moving the two halves of the adjustment mechanism 13 in respect to each other.

Figure 6:
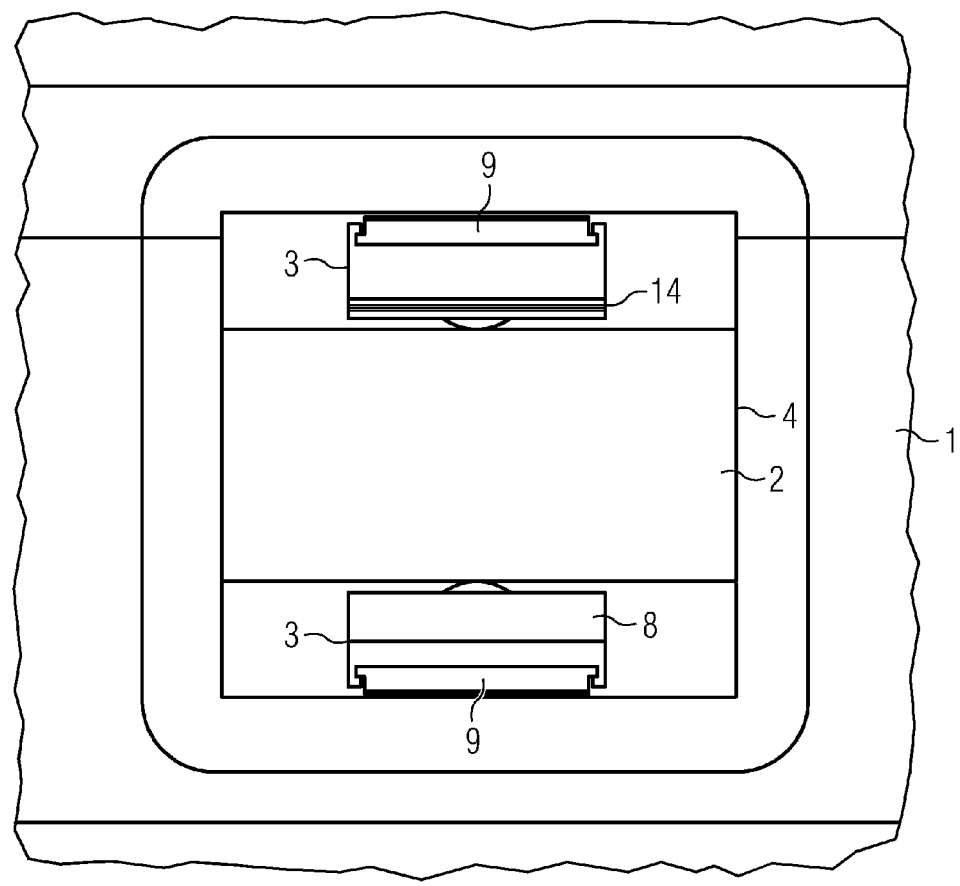
FIG. 6 shows a bearing pad with shins

FIG. 6 shows a bearing pad with shins.
FIG. 6 shows an opening 4 in a first bearing shell 1. The second bearing shell 2 is visible through the opening 4. Two bearing pads 3 are visible through the opening 4. The bearing pads 3 comprise a pad carrier 8 and liners 9.

One of the pad carriers 3 shows shins 14 to adjust the height of the bearing pad 3. Shins 14 can be used in combination with the bearing pad 3 to adjust the heights of the bearing pad according to the clearance between the first bearing shell 1 and the second bearing shell 2.

After the treatment of the sliding surface of the sliding bearing the clearance between the first bearing shell 1 and the second bearing shell 2 might have changed. The height of the bearing pad 3 can be adjusted to keep the tolerance of the sliding bearing constant. One or more shins 14, or a shin 14 with a certain thickness can be used to adjust the height of the bearing pad 3.

Figure 7:
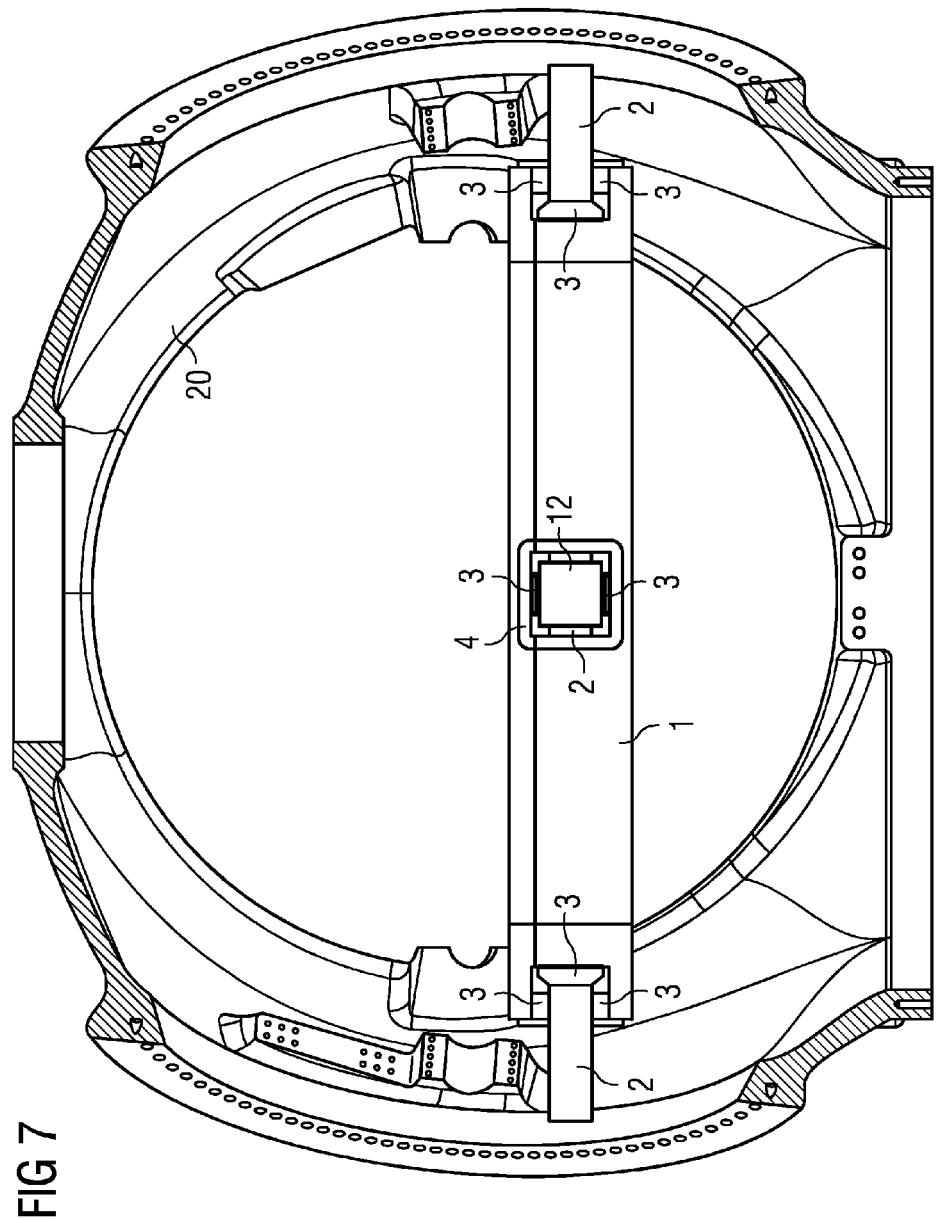
FIG. 7 shows a sliding bearing in a hub of a wind turbine

FIG. 7 shows a sliding bearing in a hub of a wind turbine.

FIG. 7 shows a sliding bearing according to the invention that is used in a hub of a wind turbine. The sliding bearing is arranged in a hub 20 of a wind turbine. The bearing is used as the main bearing in a wind turbine. A main bearing in a wind turbine can have more then one meter in diameter.

The bearing comprises a first bearing shell 1 and a second bearing shell 2. Bearing pads 3 are arranged between the bearing shells. An opening 4 is arranged in the first bearing shell 1. Through the opening 4 the bearing pads 3 are visible.

One of the bearing pads 3 is equipped with a liner with a machining property 12. The liner 12 is sliding along the sliding surface of the first bearing shell 1 when the bearing shells are rotating in respect to each other.

The liner 12 of the bearing pad 3 is when treating the sliding surface. The machining property can be a polishing pad for example, to polish the sliding surface.

Figure 8:
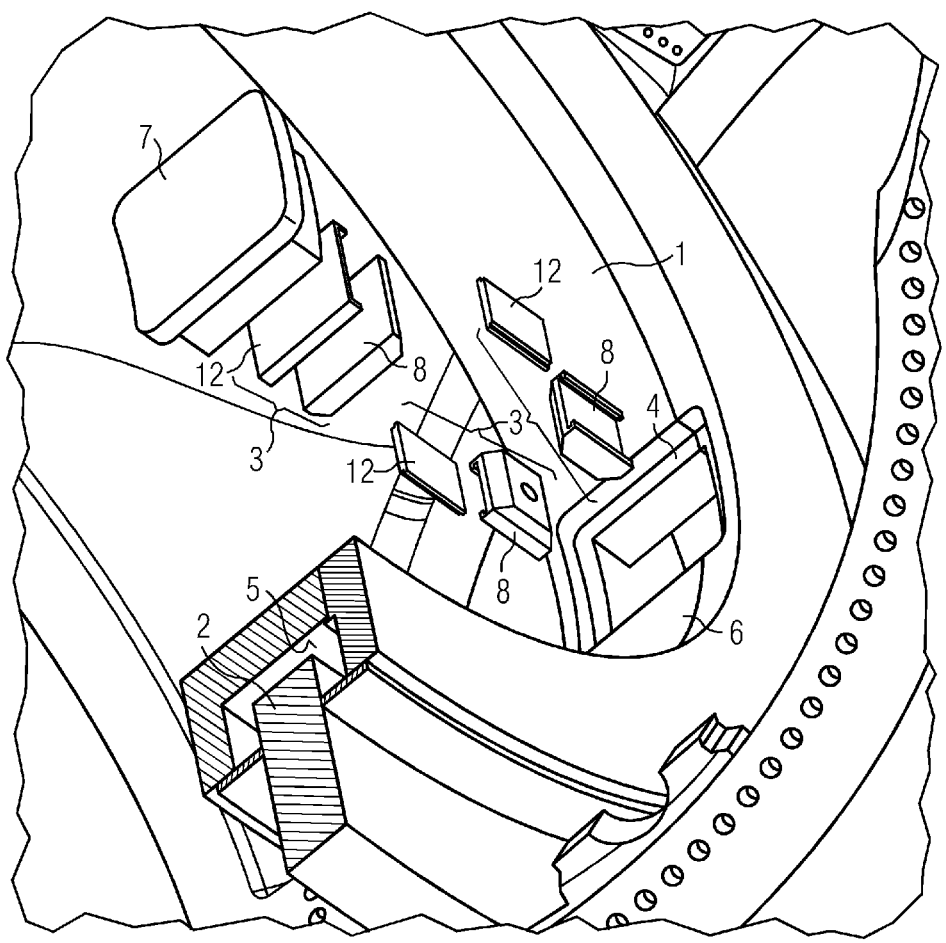
FIG. 8 shows a detailed view of the sliding bearing and an opening

FIG. 8 shows a detailed view of the sliding bearing and an opening.

FIG. 8 shows the exchange of liners 9 of bearing pads 3 with liners with a machining property 12. A cover 7 covers the opening 4. The cover 7 is opened to gain access to the opening 4. The liners are then exchanged through the opening 4 with liners 12 with a surface with a machining property. The liners are mounted to pad carriers 8 that can also be exchanged through the opening 4.

The opening 4 is a through hole from the outer surface 6 of the first bearing shell 1 to the inner surface 5 of the first bearing shell 1. Bearing pads 3 are arranged between the first and the second bearing shell. The bearing pads 3 are attached to the second bearing shell 2 and will slide along the inner surface 5 of the first bearing shell 1, which is the sliding surface of the sliding bearing.

The liners 12 with the machining property can be mounted to the pad carriers 8. The cover 7 is closed and the bearing shells are rotated in respect to each other. The liners 12 then slide along the sliding surface and treat the sliding surface with their surface with the machining property. The machining property can be a polishing property or a sanding property for example.

The invention claimed is:

1. A sliding bearing of a wind turbine, comprising:
a first bearing shell comprising a sliding surface;
a second bearing shell;
a plurality of bearing pads arranged between the first bearing shell and the second bearing shell; and
a machining element arranged between the first bearing shell and the second bearing shell to treat the sliding surface,
wherein the bearing pads are connected to the second bearing shell, and
wherein the sliding surface is prepared and arranged so that the bearing pads can slide along the sliding surface when the first bearing shell and the second bearing shell are moved in respect to each other.

2. The sliding bearing according to claim 1, wherein at least one of the bearing pads is prepared and arranged to be replaced by the machining element.

3. The sliding bearing according to claim 1, wherein the machining element is a bearing pad with a machining surface.

4. The sliding bearing according to claim 1, wherein at least one bearing pad comprises a pad carrier and a liner, and wherein the machining element is a pad carrier with a liner having a machining property.

5. The sliding bearing according to claim 1, further comprising an opening in the first bearing shell, wherein the opening is a through hole leading from an outer surface to an inner surface of the first bearing shell, and wherein the opening is prepared and arranged so that the machining element is arranged between the first bearing shell and the second bearing shell through the opening.

6. The sliding bearing according to claim 1, wherein at least one bearing pad is prepared and arranged so that a thickness of the bearing pad is adapted to a clearance between the first bearing shell and the second bearing shell.

7. The sliding bearing according to claim 1, wherein at least one bearing pad comprises an adjustment mechanism so that a thickness of the bearing pad is adjusted to a clearance between the first bearing shell and the second bearing shell.

8. The sliding bearing according to claim 1, further comprising a shin to adjust a thickness of at least one bearing pad to a clearance between the first bearing shell and the second bearing shells.

9. A method for performing a service at a sliding bearing of a wind turbine, comprising:
providing the sliding bearing comprising:
a first bearing shell comprising a sliding surface;
a second bearing shell;
a plurality of bearing pads arranged between the first bearing shell and the second bearing shell;
a machining element arranged between the first bearing shell and the second bearing shell,
wherein the bearing pads are connected to the second bearing shell, and
wherein the sliding surface is prepared and arranged so that the bearing pads can slide along the sliding surface when the first bearing shell and the second bearing shell are moved in respect to each other; and
treating the sliding surface using the machining element.

10. The method according to claim 9, further comprising rotating the bearing to apply the machining element on an inner surface of the bearing.

11. The method according to claim 9, further comprising flushing the bearing to remove loose particles from the bearing.

12. A machining element for performing a service at a sliding bearing of a wind turbine, comprising:
a first bearing shell comprising a sliding surface;
a second bearing shell; and
a plurality of bearing pads arranged between the first bearing shell and the second bearing shell,
wherein the bearing pads are connected to the second bearing shell,
wherein the sliding surface is prepared and arranged so that the bearing pads can slide along the sliding surface when the first bearing shell and the second bearing shell are moved in respect to each other, and
wherein the machining element is arranged between the first bearing shell and the second bearing shell to treat the sliding surface for performing the service at the sliding bearing.

* * * * *